US009489584B2

United States Patent
Osanai et al.

(10) Patent No.: US 9,489,584 B2
(45) Date of Patent: Nov. 8, 2016

(54) INTERSECTION RECOGNITION DEVICE AND ROAD TYPE RECOGNITION DEVICE

(71) Applicant: DENSO CORPORATION, Kariya, Aichi-pref. (JP)

(72) Inventors: Satoshi Osanai, Obu (JP); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/403,527

(22) PCT Filed: May 24, 2013

(86) PCT No.: PCT/JP2013/064521
§ 371 (c)(1),
(2) Date: Nov. 24, 2014

(87) PCT Pub. No.: WO2013/176268
PCT Pub. Date: Nov. 28, 2013

(65) Prior Publication Data
US 2015/0161455 A1 Jun. 11, 2015

(30) Foreign Application Priority Data

May 25, 2012 (JP) .................................. 2012-119842

(51) Int. Cl.
*G06K 9/00* (2006.01)
*G06K 9/20* (2006.01)
(Continued)

(52) U.S. Cl.
CPC ....... *G06K 9/00798* (2013.01); *G06K 9/00791* (2013.01); *G06K 9/00805* (2013.01); *G06K 9/00818* (2013.01); *G06K 9/00825* (2013.01);
(Continued)

(58) Field of Classification Search
None
See application file for complete search history.

(56) References Cited

U.S. PATENT DOCUMENTS 6,191,704 B1 * 2/2001 Takenaga .............. G01S 13/931
180/169
8,346,426 B1 * 1/2013 Szybalski ............. B60W 50/14
701/25
(Continued)

FOREIGN PATENT DOCUMENTS

EP 2393295 A1 * 12/2011 ............ B60W 40/04
JP 2001264093 A 9/2001
(Continued)

OTHER PUBLICATIONS

Office Action dated Dec. 15, 2015 in corresponding Japanese Application No. 2012119842 with English translation.
(Continued)

*Primary Examiner* — Matthew Bella
*Assistant Examiner* — Jose M Torres
(74) *Attorney, Agent, or Firm* — Harness, Dickey & Pierce, P.L.C.

(57) ABSTRACT

An intersection recognition device installed in a vehicle includes an image acquisition unit that acquires images around the moving vehicle. The device includes an extraction unit that extracts, from the images acquired by the image acquisition unit, a type and a position of at least one traffic marking existing around the vehicle. The device includes a determination unit that determines whether an intersection exists based on the type of the at least one traffic marking extracted by the extraction unit and a relative position relationship between the at least one traffic marking and the vehicle.

16 Claims, 5 Drawing Sheets

(51) Int. Cl.
G06K 9/46 (2006.01)
G06T 7/00 (2006.01)
G08G 1/0962 (2006.01)
G08G 1/16 (2006.01)
G06K 9/52 (2006.01)
G06T 7/20 (2006.01)

(52) U.S. Cl.
CPC . *G06K 9/52* (2013.01); *G06T 7/20* (2013.01); *G08G 1/09626* (2013.01); *G08G 1/165* (2013.01); *G08G 1/166* (2013.01)

(56) References Cited

U.S. PATENT DOCUMENTS

| | | | |
|---|---|---|---|
| 8,493,198 B1* | 7/2013 | Vasquez | B60Q 9/008 340/425.5 |
| 2005/0196019 A1* | 9/2005 | Taniguchi | G06K 9/00798 382/104 |
| 2008/0004761 A1 | 1/2008 | Yamada | |
| 2008/0056535 A1* | 3/2008 | Bergmann | G01C 21/30 382/103 |
| 2009/0058678 A1* | 3/2009 | Matsuoka | B60Q 9/008 340/904 |
| 2009/0303078 A1* | 12/2009 | Mochizuki | G08G 1/166 340/901 |
| 2010/0231718 A1 | 9/2010 | Nakamori et al. | |
| 2013/0028479 A1 | 1/2013 | Nakamori et al. | |
| 2013/0253754 A1* | 9/2013 | Ferguson | G05D 1/0231 701/28 |
| 2014/0218214 A1* | 8/2014 | Yester | G08G 1/0967 340/905 |

FOREIGN PATENT DOCUMENTS

| | | |
|---|---|---|
| JP | 2004102827 A | 4/2004 |
| JP | 2005347945 A | 12/2005 |
| JP | 2006119090 A | 5/2006 |
| JP | 2006215982 A | 8/2006 |
| JP | 2006226700 A | 8/2006 |
| JP | 2007034920 A | 2/2007 |
| JP | 2007266976 A | 10/2007 |
| JP | 2008009870 A | 1/2008 |
| JP | 2010211701 A | 9/2010 |
| JP | 2010224670 A | 10/2010 |
| JP | 2010244254 A | 10/2010 |
| JP | 2011018166 A | 1/2011 |

OTHER PUBLICATIONS

International Preliminary Report on Patentability in corresponding PCT Application No. PCT/JP2013/064521.
International Search Report (in Japanese with English Translation) for PCT/JP2013/064521, mailed Jun. 18, 2013; ISA/JP.
Written Opinion for PCT/JP2013/064521, mailed Jun. 18, 2013; ISA/JP.

* cited by examiner

INTERSECTION RECOGNITION DEVICE AND ROAD TYPE RECOGNITION DEVICE

CROSS REFERENCE TO RELATED APPLICATIONS

This application is a U.S. National Phase Application under 35 U.S.C. 371 of International Application No. PCT/JP2013/064521filed on May 24, 2013 and published in Japanese as WO 2013/176268 A1 on Nov. 28, 2013. This application is based on and claims the benefit of priority from Japanese Patent Application No. 2012-119842 filed May 25, 2012. The entire disclosures of all of the above applications are incorporated herein by reference.

TECHNICAL FIELD

The present disclosure relates to an intersection recognition device and a road type recognition device that recognize intersections on roads where a vehicle is moving and types of the roads.

BACKGROUND ART

For instance, there is a technique to extract, from images taken by an in-vehicle camera, white lines located at the left and right sides of a vehicle and pedestrian crossings using image processing. The technique is to detect intersections and/or junctions based on whether there are extracted left and right white lines and pedestrian crossings, which is disclosed in patent document 1.

CITATION LIST

Patent Document

[Patent Document 1] Japanese Patent Laid-Open No. 2010-211701

SUMMARY OF INVENTION

The technique detects intersections based on whether there are left and right white lines and pedestrian crossings. However, there may be a problem of the technique being unable to recognize intersections and detect junctions precisely only using information indicative of whether there are left and right white lines and pedestrian crossings.

PROBLEM TO BE SOLVED BY INVENTION

This disclosure has been made in consideration of the problem. It is aimed to provide an intersection recognition device, which recognizes intersections on roads where the vehicle is moving more precisely than the conventional technique. It is also aimed to provide a road type recognition device, which recognizes road types more accurately than the conventional technique.

MEANS FOR SOLVING PROBLEM

An intersection recognition device according to an exemplary aspect of the present invention includes an image acquisition unit, an extraction unit, and a determination unit.

The image acquisition unit acquires images of around the moving vehicle. The extraction unit extracts, from the images acquired by the image acquisition unit, a type and a position of at least one traffic marking existing around the vehicle.

The determination unit determines whether an intersection exists based on the type of the at least one traffic marking extracted by the extraction unit and a relative position relationship between the at least one traffic marking and the vehicle.

The intersection recognition device results in recognition of intersections existing in a road on which the vehicle is moving more precisely. The reasons are stated as follows.

In the vicinity of an intersection, there are traffic markings drawn on the road. The traffic markings include: lane lines to indicate vehicle traffic lanes; broken lines located inside the lane lines to prohibit lane changes; diamond-shape marks indicating the existence of pedestrian crossings; arrows for straight and left/right turns; stop lines, "stop" signs; road surface markings such as pedestrian crossings; and mark lines.

Therefore, the traffic markings appear in order as the vehicle, which is moving, approaches the intersection.

The periphery images around the vehicle are acquired by the image acquisition unit, and traffic markings around the vehicle are extracted from the acquired images. Based on the types of the extracted traffic markings and the positions of the extracted traffic markings relative to the vehicle, in other words, based on where the specific types of the traffic markings are located relative to the vehicle, the intersection recognition device determines whether there is an intersection.

Thus, the intersection recognition device recognizes the existence of an intersection more precisely. This is because the intersection recognition device determines whether there is an intersection based on the traffic markings appearing around the vehicle, which is moving, and the positions of the traffic markings relative to vehicle, comparing with just recognizing an intersection based on the existence of traffic lane lines and pedestrian crossings.

By the way, in fact, various road surface markings and mark lines are drawn on roads in the vicinity of intersections.

The traffic markings extracted by the extraction unit include diamond-shape marks indicating the existence of pedestrian crossings, arrows for straight and left/right turns, stop lines, "stop" signs, pedestrian crossings, bicycle crossings, broken lines inside the lane lines, destination names, and road colors. Extracting the traffic markings, results in extraction of the road surface markings and mark lines. Therefore, the intersection recognition device recognizes an intersection precisely.

Additionally, the extraction unit extracts a type and a position of at least one peripheral object being comprised of a stationary object and a moving object existing around the vehicle, in addition to the type and the position of the at least one traffic marking. The determination unit determines whether there is an intersection based on the type of the at least one peripheral object existing around the vehicle and the position of the at least one peripheral object relative to the vehicle extracted by the extraction unit, in addition to the at least one traffic marking.

This results in recognition of an intersection based on not only road surface markings and mark lines along the vehicle's moving direction in an intersection, but also vehicles moving on a road intersecting with the moving direction and pedestrians and bicycles going across pedestrian crossings. Therefore, the intersection recognition device recognizes an intersection much more precisely.

A road type recognition device according to another exemplary aspect of the present invention includes:

an intersection recognition device that is an exemplary aspect to the present invention;

a distance obtaining unit that obtains a traveling distance of the vehicle; and a road recognition unit that recognizes that a type of a road on which the vehicle is traveling is:

an urban area road if the number of intersections recognized by the intersection recognition device is equal to or more than a predetermined number within a predetermined traveling distance obtained by the distance obtaining unit, or a road other than urban area roads if the number of intersections recognized by the intersection recognition device is less than the predetermined number within the predetermined traveling distance obtained by the distance obtaining unit.

According to the road type recognition device, it is possible to recognize precisely whether there is an urban area road or a road other than urban area roads based on the number of intersections precisely recognized.

DESCRIPTION OF EMBODIMENT

Embodiments, to which the present disclosure is applied, will be described hereinafter with reference to accompanying drawings. The present invention is not only limited to the following embodiments, but also it can be modified within the technological scope of the present invention.

[First Embodiment]

Figure 1:
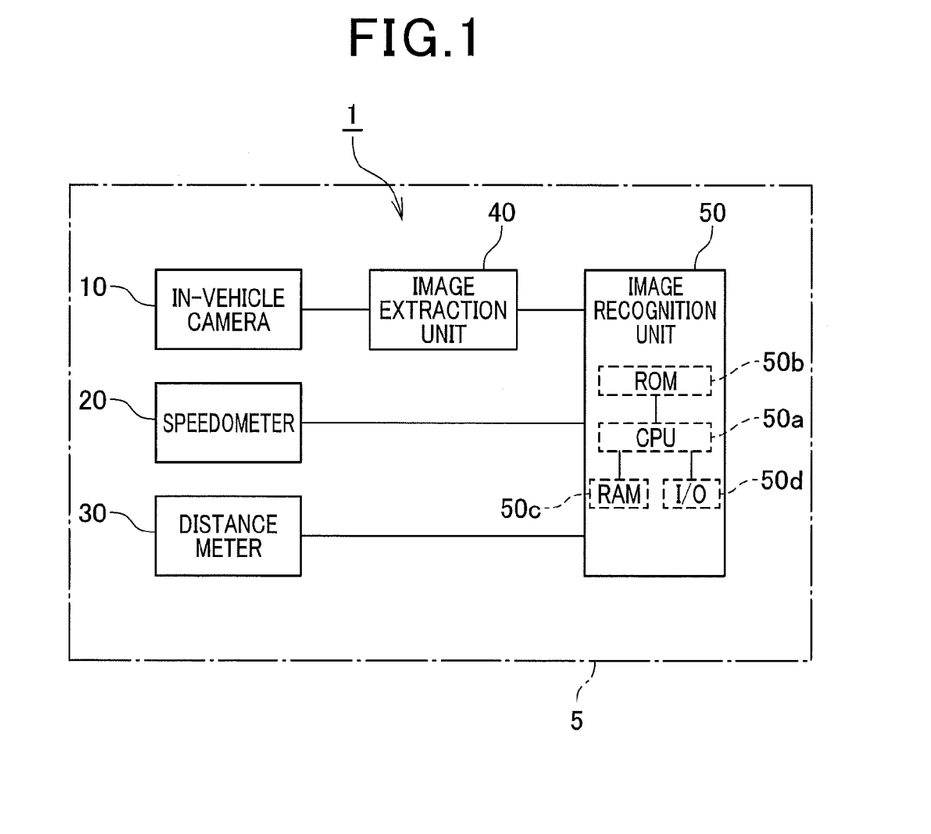
FIG. 1 is a block diagram illustrating a schematic structure of a road type recognition device according to the first embodiment of the disclosure.

A road type recognition device 1 according to a first embodiment is installed in a vehicle 5. The road type recognition device 1 is equipped with an in-vehicle camera 10, a speedometer 20, a distance meter 30, an image extraction unit 40, and an image recognition unit 50.

The in-vehicle camera 10 is a camera that acquires images around the vehicle 5. The in-vehicle camera 10 is configured to pick up front images, rear images, and images of side-views of the vehicle 5.

The speedometer 20 is a device to acquire the velocity of the vehicle 5, and the distance meter 30 is a device to acquire the vehicle's traveling distance.

The image extraction unit 40 is a processor for image processing. The image extraction unit 40 extracts, from images around the vehicle 5 picked up by the in-vehicle camera 10, traffic markings exist around the vehicle 5. The traffic markings include: mark lines including lane lines; road-surface markings; and/or traffic signs. Specifically, the image extraction unit 40 obtains at least the types and positions of traffic markings exist around the vehicle 5 as traffic marking information.

For instance, traffic markings extracted by the image extraction unit 40 include diamond-shape marks indicating the existence of pedestrian crossings, arrows for straight and left/right turns, stop lines, "stop" signs, pedestrian crossings, bicycle crossings, broken lines inside the lane lines, destination names, and road colors.

Figure 4:
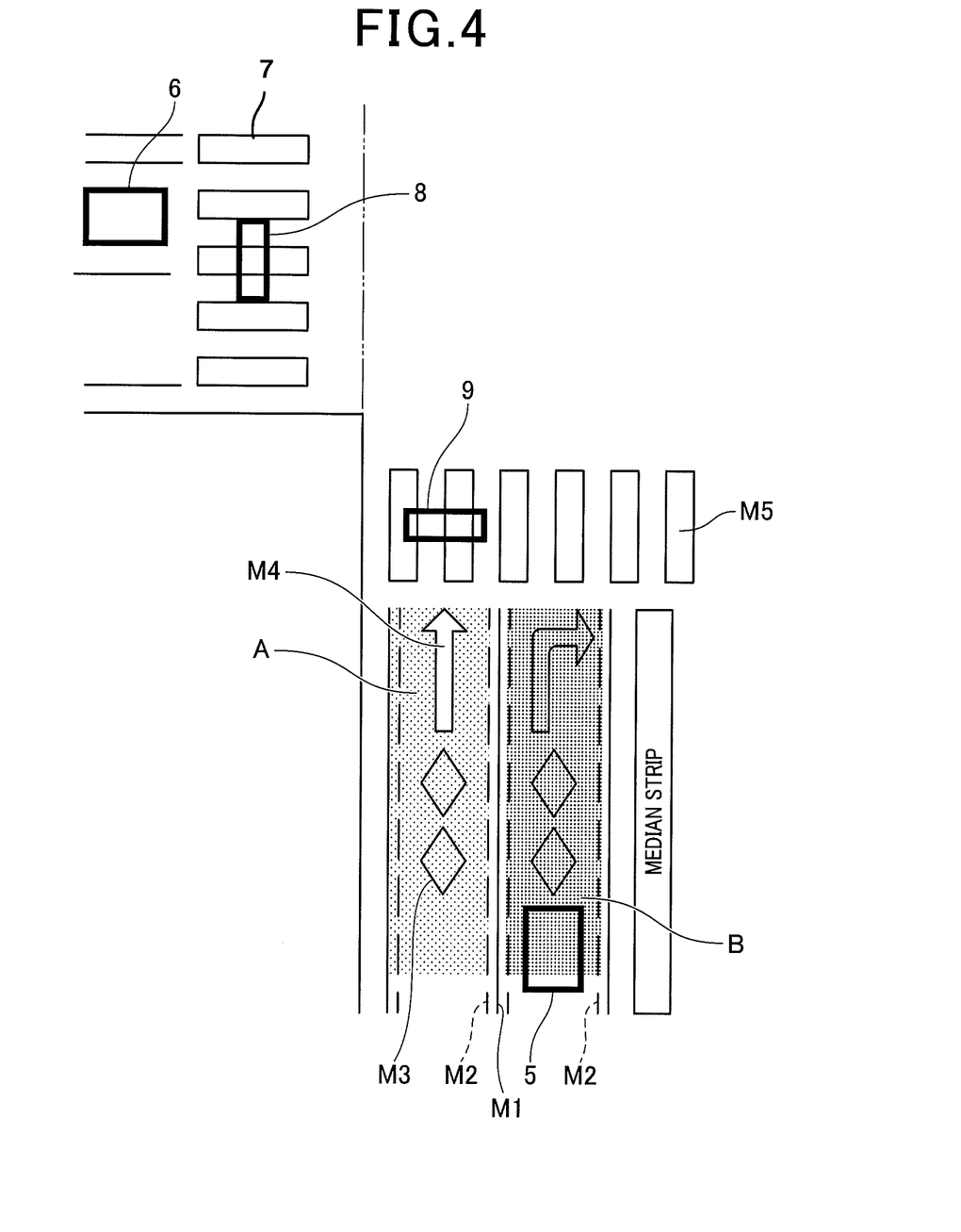
FIG. 4 is a schematic diagram of an intersection recognized in the intersection recognition process illustrated in FIG. 3.

The image extraction unit 40 extracts, in addition to the road surface markings and mark lines, a pedestrian bridge; a vehicle 6 moving sideways relative to the vehicle 5; a pedestrian crossing 7 which is in the same movement direction with the vehicle 5; and pedestrians and a bicycle 8 going across a pedestrian crossing 7 which is in the same movement direction with the vehicle 5 (see FIG. 4).

The image recognition unit 50 is provided with a CPU 50a, a ROM 50b, a RAM 50c, an I/O 50d, and others; the ROM 50b, the RAM 50c, and the I/O 50d are connected to the CPU 50a. The image recognition unit 50 recognizes intersections based on the positions of the lane lines, the road surface markings, and the mark lines relative to the vehicle 5; the lane lines, the road-surface markings, and the mark lines are drawn on the roads and extracted by the image extraction unit 40. The image recognition unit 50 recognizes the type of a road on which the vehicle 5 is moving.

The details of the process for the road type recognition, i.e. the road type recognition process, and the process for intersection recognition, i.e. the intersection recognition process, in the image recognition unit 50 will be described as follows.

(Descriptions of the Road Type Recognition Process)

Figure 2:
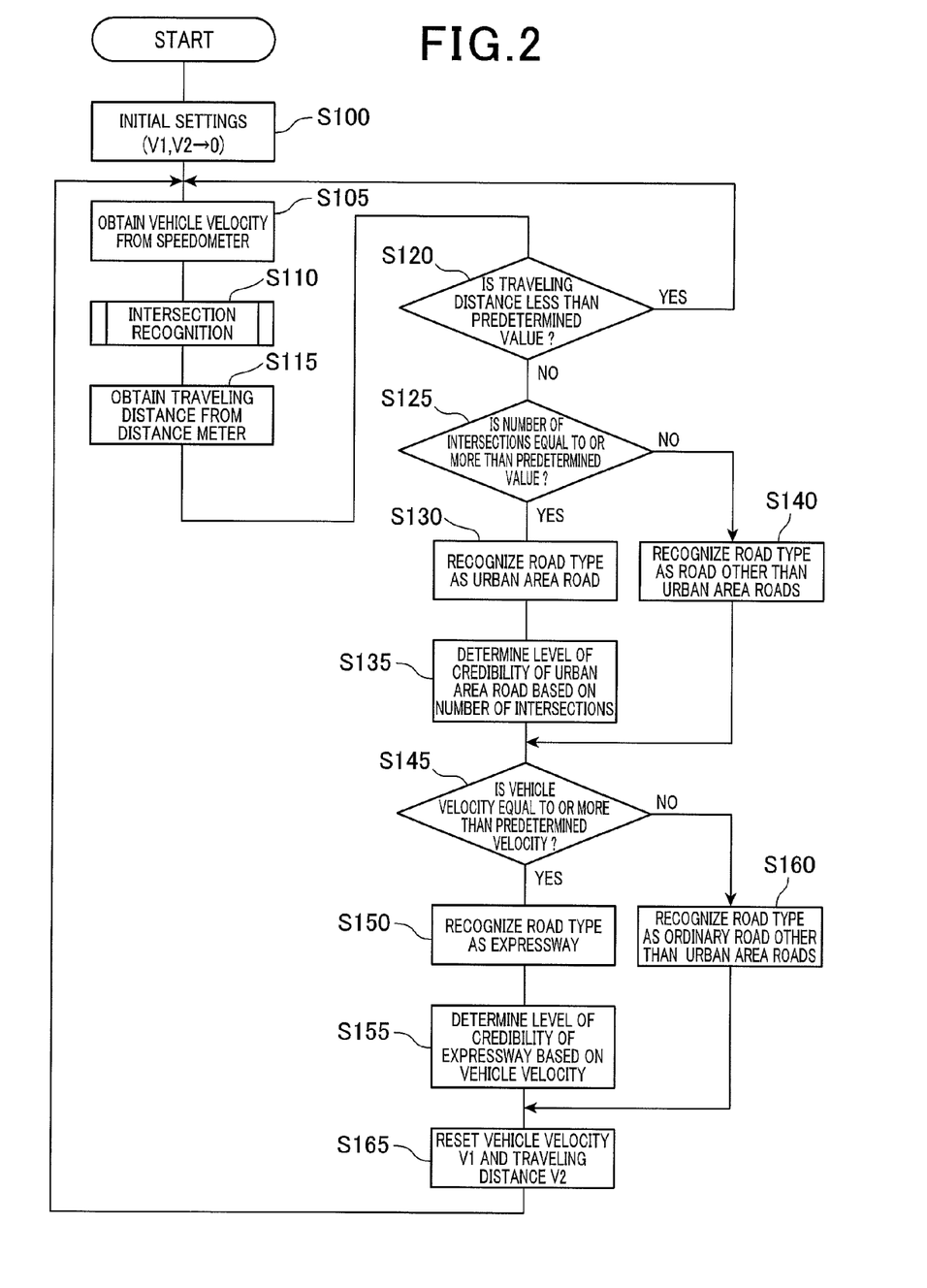
FIG. 2 is a flowchart illustrating the flow of a road type recognition process performed by the road type recognition device illustrated in FIG. 1.

Next, the road type recognition process is described based on FIG.

2. The road type recognition process is started when the power source of the road type recognition device 1 is turned on. At step S100, the CPU 50a performs initial settings.

The CPU 50a sets variables V1 and V2 stored in the RAM 50c to 0 in the initial settings; the variables V1 and V2 respectively represent the vehicle's velocity and the traveling distance.

At subsequent step S105, the CPU 50a obtains the velocity of the vehicle 5, i.e. the vehicle velocity, from the speedometer 20 via the I/O 50d, and the CPU 50a sets the variable V1 to the obtained vehicle velocity. At subsequent step S110, the CPU 50a performs the intersection recognition. Regarding the intersection recognition process, the details will be described later.

At step S115, the CPU 50a obtains the traveled distance of the vehicle 5 from the distance meter 30, and the CPU 50a sets the variable V2 to the obtained traveled distance. At subsequent step S120, the CPU 50a determines whether the traveled distance obtained at step S115 is less than a predetermined value.

If the traveled distance is determined to be less than the predetermined value (step S120: Yes), the CPU 50a brings the process returning to step S105, and repeats the road type recognition process.

Otherwise, if the traveled distance is determined to be equal to or more than the predetermined value (step S120: No), the CPU 50a transfers the process to step S125.

At step S125, the CPU 50a determines whether the number of recognized intersections at step S110 is equal to or more than a predetermined value. If the number of recognized intersections is determined to be equal to or more than the predetermined value (step S125: Yes), the CPU 50a transfers the process to step S130, and if the number of recognized intersections is determined to be less than the predetermined value (step S125: No), the CPU 50a transfers the process to step S140.

At step S130, the CPU 50a recognizes that the type of the road on which the vehicle 5 is moving is an urban area road. At subsequent step S135, the CPU 50a determines the level of credibility in the recognition of the urban area road based on the number of recognized intersections at step S110. Then, the CPU 50a transfers the process to step S140.

Normally, there many intersections in an urban area, and the number of intersections in an area other than urban areas is smaller than that of in an urban area. Using this point, the credibility determination process in step S135 determines the level of credibility in the recognition of the urban area road based on the number of intersections.

For instance, it is assumed that the above traveled distance is set as 1 [km]. In this assumption, if the number of intersections within 1 [km] is equal to or more than 10, the credibility determination process determines that the level of credibility in the recognition of the urban area road is equal to or more than 90%. If the number of intersections within 1 [km] is within the range from 9 to 7, the credibility determination process determines that the level of credibility in the recognition of the urban area road is 70%. If the number of intersections within 1 [km] is within the range from 6 to 4, the credibility determination process determines that the level of credibility in the recognition of the urban area road is 50%. If the number of intersections within 1 [km] is equal to or less than 3, the credibility determination process determines that the level of credibility in the recognition of the urban area road is set to be less than 50%.

On the other hand, at step S140, the CPU 50a transfers the process to step S145 after recognizing that the type of the road on which the vehicle 5 is moving is a road other than an urban area road.

At step S145, the CPU 50a determines whether the vehicle velocity obtained at step S105 is equal to or more than a predetermined velocity based on the value of the variable V1. If it is determined that the vehicle velocity is equal to or more than the predetermined velocity (step S145: Yes) the CPU 50a transfers the process to step S150, and otherwise if it is determined that the vehicle velocity is less than the predetermined velocity (step S145: No), the CPU 50a transfers the process to step S160.

At step S150, the CPU 50a recognizes the type of the road on which the vehicle 5 is moving as an expressway. At subsequent step S155, the CPU 50a determines the level of credibility in the recognition that the type of the vehicle's moving road is an expressway based on the vehicle velocity.

Normally, if the vehicle 5 is moving on an expressway, the vehicle velocity at a given traveled distance is higher than the vehicle velocity if the vehicle 5 is moving on an ordinary road. Using this point, the credibility determination process in step S155 determines the level of credibility of recognition that the type of the vehicle's moving road is the expressway depending on the vehicle velocity.

For instance, if the vehicle velocity is equal to or more than 80 [km/h], the credibility determination process sets the level of credibility of the recognition that the type of the vehicle's moving road is the expressway to 90%. If the vehicle velocity is within the range from 80 to 60 [km/h], the credibility determination process sets the level of credibility of the recognition that the type of the vehicle's moving road is the expressway to 70%. If the vehicle velocity is within the range from 60 to 40 [km/h], the credibility determination process sets the level of credibility in the recognition that the type of the vehicle's moving road is the expressway to 50%. If the vehicle velocity is less than 40 [km/h], the credibility determination process sets the level of credibility in the recognition that the type of the vehicle's moving road is the expressway to be less than 50%.

On the other hand, at step S160, the CPU 50a transfers the process to step S165 after recognizing that the type of the road on which the vehicle 5 is moving is an ordinary road other than urban area roads, such as a mountain road, a suburban road, and the like.

At step S165, the CPU 50a brings the process returning to step S105, and repeats the road type recognition process after resetting both the variable V1 expressing the vehicle velocity and the variable V2 expressing the traveled distance to 0.

Note that the road type recognition process will be terminated with power-off of the road type recognition device 1.

(Descriptions of the Intersection Recognition Process)

Next, the operation at step S110 in the road type recognition process, i.e. the intersection recognition process, which is a subroutine of the road type recognition process, is described as follows with reference to FIGS. 3 and 4.

In the intersection recognition process, the CPU 50a obtains traffic marking information that expresses type and position of each of the traffic markings extracted by the image extraction unit 40 at step S200.

As above stated, the traffic-marking types obtained from the image extraction unit 40 include, as the road surface markings and/or mark lines, the diamond-shape marks indicating the existence of pedestrian crossings, arrows for straight and left/right turns, stop lines, "stop" signs, pedestrian crossings, bicycle crossings, broken lines inside the lane lines, and others.

Additionally, the traffic markings include color-painted portions drawn on roads and "destination names" (not illustrated), which are to identify straight lanes and right turn lanes.

At subsequent step S205, the CPU 50a performs the recognition process for intersections of the road on which the vehicle 5 is moving based on the traffic marking information expressing the type and position of each of the traffic markings obtained at step S200. Then, the CPU 50a determines whether the CPU 50a has recognized an intersection on the road on which the vehicle 5 is moving.

Around an intersection, as illustrated in FIG. 4, there are road surface markings drawn on the road surface; the road surface markings include:

a lane line M1 indicating a vehicle moving lane;

mark lines M2, such as broken lines, located inside the lane line to prohibit lane changes;

diamond-shape marks M3 indicating the existence of pedestrian crossing;

arrows M4 for straight and left/right turns;

stop lines (not shown);

"stop" signs (not shown); and a pedestrian crossing M5.

Additionally, around the intersection, there are color-painted portions A and B drawn on the road surface, which are to identify a linear lane and a right turn lane.

Therefore, the approach of the vehicle 5 to an intersection enables the CPU 50a to determine whether there is an intersection on the road on which the vehicle 5 is moving according to the relative positional relationship of each traffic marking to the vehicle 5; the relative positional relationship represents where each traffic marking is located relative to the vehicle 5.

The process for recognizing an intersection based on where each traffic marking is located relative to the vehicle 5 is described as follows.

For instance, if several road surface markings are drawn on the road, when the vehicle 5 approaches an intersection, each of the road surface markings approaches the vehicle 5 and passes through the vehicle 5 while the mark lines, such as the lane lines and broken lines, exist at lateral sides of the vehicle 5.

In other words, the CPU 50a is capable of, based on where each of the traffic markers extracted from the images around the vehicle 5 is located relative to the vehicle 5, determining:

whether an intersection has been recognized, i.e. whether an intersection exists on the road on which the vehicle 5 is moving; and the positional relationship between the vehicle and the intersection when the intersection has been recognized.

The positional relationship includes whether the intersection is located in front of the vehicle, whether the vehicle is entering into the intersection, and whether the vehicle has passed through, i.e. whether the vehicle exited from the intersection.

For instance, the CPU 50a is capable of performing the determination based on whether each of the traffic markings is located at the forward, backward, or sideward of the vehicle 5, or whether each of the traffic markings is located to be farther or nearer than a predetermined distance.

For instance in the above stated case, the CPU 50a is configured to recognize that there is an intersection in front of the vehicle, i.e. in front of the moving side, when passing the road surface markings on the road in order and the mark lines exist at lateral sides.

According to the determination result in step S210, if an intersection is determined to have been recognized on the vehicle's moving road (step S210: Yes), the CPU 50a transfers the process to step S215. Otherwise, if an intersection is determined not to have been recognized (step S210: No), the CPU 50a transfers the process to step S255.

At step S215, in addition to the road surface markings, the CPU 50a obtains the type and position information about each of:

a pedestrian bridge;

a vehicle 6 moving sideways relative to the vehicle 5;

a pedestrian crossing 7 each of which is in the same movement direction as that of the vehicle 5;

pedestrians walking across a pedestrian crossing 7 which is in the same movement direction as that of the vehicle 5; and a bicycle 8 going across a pedestrian crossing 7 which is in the same movement direction as that of the vehicle 5.

Note that a vehicle 6 moving sideways relative to the vehicle 5 means, for instance, a vehicle moving across in front of the vehicle 5.

A pedestrian crossing 7, which is in the same movement direction as that of the vehicle 5, means a pedestrian crossing located at a lateral side of the vehicle 5, i.e. a pedestrian crossing which the vehicle 5 does not go across.

At subsequent step S220, the CPU 50a performs the intersection recognition process based on the positions of the vehicle(s), pedestrian(s), and the like with respect to the vehicle 5 obtained at step S215. Then, the CPU 50a determines whether an intersection has been recognized on the road on which the vehicle is moving in step S225.

In the vicinity of an intersection, in addition to the above-stated road surface markings, there is an appearance of:

a pedestrian bridge;

a vehicle 6 moving sideways relative to the vehicle 5;

a pedestrian crossing 7 each of which is in the same movement direction as that of the vehicle 5;

pedestrians walking on a pedestrian crossing 7 which is in the same movement direction as that of the vehicle 5; and a bicycle 8 going across a pedestrian crossing 7 which is in the same movement direction as that of the vehicle 5.

In other words, stationary objects (a pedestrian bridge, a pedestrian crossing) and moving objects (a vehicle, a pedestrian vehicle, and others), which are existing in the vicinity of an intersection, have supposed position relationships relative to the vehicle 5.

Accordingly, the CPU 50a obtains, from the image extraction unit 40, the types and positions of the respective stationary and moving objects around the vehicle 5 as object information for intersection identification.

Additionally, the CPU 50a determines, based on the object information for intersection identification representing the type and position of each of the stationary and moving objects around the vehicle 5, whether each object has a positional relationship, which is supposed as an object adjacent to an intersection, relative to the vehicle 5. In other words, the CPU 50a determines whether each object is located at the forward, backward, or sideward of the vehicle 5, or whether each object is located to be farther or nearer than a predetermined distance.

Based on the results of the determination, the CPU 50a determines:

whether an intersection has been recognized, i.e. whether an intersection exists, on the road on which the vehicle 5 is moving; and the positional relationship between the vehicle and the intersection when the intersection has been recognized.

The positional relationship includes whether the intersection is located in front of the vehicle, whether the vehicle is entering into the intersection, and whether the vehicle has passed through, i.e. whether the vehicle exited from the intersection.

According to the results of the determination at subsequent step S225, if it is determined that an intersection has been recognized in step S225 (step S225: Yes), the CPU 50a transfers the process to step S230.

Otherwise, if it is determined that an intersection has not been recognized in step S225 (step S225: No), the CPU 50a transfers the process to step S255.

At step S230, the CPU 50a obtains the traffic marking information expressing the type and position of each of the traffic markings extracted by the image extraction part 40, which is similar to step S200. At subsequent step S235, the CPU 50a obtains the object information for intersection identification from the image extraction unit 40, which is similar to step S215. The object information for intersection identification includes the type and position information of each of:

a pedestrian bridge;

a vehicle 6 moving sideways relative to the vehicle 5;

a pedestrian crossing 7 which is in the same movement direction as that of the vehicle 5;

pedestrians walking across the pedestrian crossing 7 which is in the same movement direction as that of the vehicle 5; and a bicycle 8 going across the pedestrian crossing 7 which is in the same movement direction as that of the vehicle 5.

At subsequent step S240, the CPU 50a determines that an intersection has been recognized, i.e. it has passed through an intersection, based on traffic marking information and the object information for intersection information when having difficulty recognizing the positions of the traffic markings and the stationary objects relative to the vehicle 5 after the positions are shortened in a predetermined order. The traffic marking information represents the type and position of each traffic marking obtained in step S230, and the object information for intersection information represents the type and position of each of the stationary and moving objects around the vehicle 5 obtained at step S235.

The expression "positions of the traffic markings or stationary objects relative to the vehicle 5 are shortened in the predetermined order" means that, for instance, the traffic markings and/or the objects approach the vehicle 5 based on the approach of the vehicle 5 to the intersection, so that the relative distances of the respective traffic markings and/or objects are shortened in order.

If there is an intersection and the vehicle 5 approaches the intersection, the traffic markings and/or stationary objects located adjacent to the intersection approach the vehicle 5 once. Thereafter, when the traffic markings and/or stationary objects are far away from the vehicle 5 after the vehicle 5 passes through the intersection, it is difficult for the CPU 50a to recognize them.

Therefore, the CPU 50a has recognized that it has passed through the intersection when, after the traffic markings or stationary objects approach the vehicle 5 once, it is difficult for the CPU 50a to recognize the traffic markings or stationary objects.

At step S245, whether an intersection has been recognized by the operation is determined in step S240. If it is determined that an intersection has been recognized (step S245: Yes), the CPU 50a finally determines to have recognized an intersection based on the recognition processes of all the recognition steps S210, S225, and S240. Then, the CPU 50a transfers the process to step S250. On the other hand, if it is determined that an intersection has not been recognized (step S245: No), the CPU 50a transfers the process to step S255.

At step S250, the CPU 50a determines the level of credibility in the above-stated final intersection-recognition results based on the number of traffic markings extracted at step S205, the number of stationary and/or moving objects, and their positions relative to the vehicle 5 extracted at step S220.

For instance, even if the CPU 50a recognizes a single pedestrian bridge which is a stationary object, there is a case where the pedestrian bridge exists on a straight road. Even if the CPU 50a recognizes an arrow road-surface marking, there is a case where the road marking does not indicate an intersection, but indicates a moving direction at the junction of roads.

Therefore, the CPU 50a determines, based on at least one of the number of extracted traffic markings and the number of extracted stationary and/or moving objects, the level of credibility in the recognition results depending on whether the number of extractions is large or small.

For instance, the CPU 50a increases the level of credibility as the number of extractions increases, and decreases the level of credibility as the number of extractions decreases.

If the credibility determination process in step S250 is completed, the CPU 50a terminates the subroutine, transfers to step S115 of the main routine illustrated in FIG. 2, and performs the process at step S115 and the following processes.

On the other hand, as described above, if there is a No decision at step S210, step S225, or step S245, in other words, if any one of the intersection recognition processes fails to recognize an intersection, the CPU 50a finally determines not to have recognized an intersection in step S255, and terminates the subroutine. Then, the CPU 50a returns to step S115 of the main routine illustrated in FIG. 2, and performs the process at step S115 and the following processes.

(Characteristics of the Road Type Recognition Device 1)

The above-described the road type recognition device 1 results in recognition of intersections existing in a road on which the vehicle 5 is moving more precisely. The reason is as follows.

Specifically, in the vicinity of an intersection, there are traffic markings drawn on the road. The traffic markings include: lane lines to indicate vehicle traffic lanes; broken lines located inside the lane lines to prohibit lane changes; diamond-shape marks indicating the existence of pedestrian crossings; arrows for straight and left/right turns; stop lines, "stop" signs; road surface markings such as pedestrian crossings; and mark lines.

Therefore, as the vehicle approaches an intersection, these road surface markings and mark lines appear in order.

In view of this, the road type recognition device 1 obtains images around the vehicle 5 using the in-vehicle camera 10, and extracts lane lines and traffic markings, such as road surface markings, mark lines, and others, drawn on a road. Then, the road type recognition device 1 performs intersection recognition based on the positions of the extracted traffic markings relative to the vehicle 5, in other words, based on where the traffic markings are located relative to the vehicle 5.

Comparing with another case to perform intersection recognition using merely the existence of traffic lane lines and/or pedestrian crossings, this case recognizes an intersection based on the positions of traffic markings, such as road surface markings and mark lines, that sequentially appear around the vehicle moving.

In fact, various traffic markings (road surface markings, mark lines, and others) are drawn on roads around an intersection. Thus, the image extraction unit 40 extracts, as road surface markings or mark lines, diamond-shape marks indicating the existence of pedestrian crossings, arrows for straight and left/right turns, stop lines, "stop" signs, pedestrian crossings, bicycle crossings, and broken lines located inside the lane lines. This results in extraction of road surface markings and/or mark lines on ordinary loads, making it possible to recognize intersections precisely.

Additionally, the image extraction unit 40 extracts stationary/moving objects in the vicinity of the vehicle 5 in addition to the road surface markings and mark lines; the stationary/moving objects include:

a pedestrian bridge;

a vehicle 6 moving sideways relative to the vehicle 5;

a pedestrian crossing 7 each of which is in the same movement direction as that of the vehicle 5;

pedestrians walking across a corresponding pedestrian crossing 7 which are in the same movement direction as that of the vehicle 5; and a bicycle 8 going across a pedestrian crossing 7 which is in the same movement direction as that of the vehicle 5.

At this time, the image recognition unit 50 recognizes an intersection, in addition to the road surface markings, based on the positions of the stationary/moving objects relative to the vehicle 5 extracted by the image extraction unit 40.

Therefore, intersection recognition is performed in consideration of not only the traffic markings in the vehicle's direction of movement in an intersection, but also vehicles moving on roads intersecting the vehicle traveling direction, pedestrians on pedestrian crossings, a bicycle 9, and others. Therefore it is possible to recognize intersections much more precisely.

If the vehicle 5 passes through an intersection, because the road surface markings, pedestrian bridges, and others in the vicinity of the intersection disappear, they are not to be extracted. Using this characteristic, the image recognition unit 50 has recognized an intersection when having difficulty recognizing the positions of traffic markings and stationary/moving objects after the positions relative to the vehicle 5 are shortened in a predetermined order. The traffic markings include road surface markings, mark lines, and others. The stationary/moving objects include pedestrian bridges; a vehicle 6 moving sideways relative to the vehicle 5; a pedestrian crossing 7 which is in the same movement direction as that of the vehicle 5; and a bicycle 8 going across a pedestrian crossing 7 which is in the same movement direction as that of the vehicle 5.

Accordingly, this results in recognition of passing through an intersection.

In other words, in the first embodiment, recognition of an intersection is finally determined when recognition of an intersection based on traffic markings; recognition of an intersection based on stationary/moving objects; and recognition of an intersection based on the fact that these traffic markings and stationary/moving objects become unrecognized are all established. This results in recognition of an intersection very accurately.

In this case, if the number of extracted traffic markings is large, it is possible to increase the level of credibility because there is a high possibility of an intersection. If the number of extracted traffic markings is small, it is possible to decrease the level of credibility because there is a possibility that road surface markings or mark lines, such as arrows for straight and left/right turns, are drawn on places where no intersections are located.

In the vicinity of an intersection, if road surface markings, mark lines, and others are extracted from images, an extraction accuracy varies depending on the vehicle velocity. In other words, generally if the vehicle velocity is high, the traffic marking extraction accuracy deteriorates, comparing with a traffic marking extraction accuracy if the vehicle velocity is low.

Accordingly, in the first embodiment, it is possible for the CPU 50a to weight the determined level of credibility based on the vehicle velocity obtained from the speedometer 20 for obtaining the velocity of the vehicle 5 in step S250.

Specifically, in step S250, it is possible for the CPU 50a to:

perform weighting to lower the level of credibility if, for instance, the velocity of the vehicle 5 is higher than a specific threshold value; and perform weighting to increase the level of credibility if the velocity of the vehicle 5 is lower than the specific threshold value.

It is possible to recognize whether the moving road of the vehicle 5 is an urban area road or a road other than urban area roads depending on the number of intersections. In other words, the number of intersections in an urban area road is greater than that of a road other than urban area roads.

Therefore, if the number of recognized intersections is equal to or more than a predetermined number within a constant distance of the vehicle 5 moving, the type of a road on which the vehicle 5 is moving is recognized as an urban area road. If the number of recognized intersections is less than the predetermined number, the type of a road is recognized as a road other than an urban area road. This makes it possible to precisely recognize whether there is an urban area road or a road other than urban area roads based on the number of precisely recognized intersections.

Additionally, if the road type recognition is performed, the level of credibility in the type of a road being an urban area road is determined depending on the number of recognized intersections.

Specifically, as the above stated, there is a large number of intersections in an urban area. For this reason, depending on the number of recognized intersections, for instance, if the number of recognized intersections is large, the level of credibility in the type of a road being recognized as an urban area road is increased, and the level of credibility is reduced with a decrease of the number of intersections. This results in an increase of the level of credibility in road-type recognition.

If the vehicle 5 is moving on an expressway, the velocity of the vehicle 5 is likely to be equal to or more than a predetermined velocity. Therefore, the speedometer 20 is provided to obtain the velocity of the vehicle 5. If the velocity of the vehicle 5 obtained by the speedometer 20 is equal to or more than the predetermined velocity, it is recognized that the type of a road on which the vehicle 5 is moving is an expressway. This makes it possible to easily identify the type of a road as an expressway.

Note that expressways include controlled-access highways.

Additionally, the higher the velocity of the vehicle 5 is on expressways (within a limited velocity), the easier it is to distinguish expressways from ordinary roads. In other words, the level of credibility based on the identification of an expressway is increased.

Thus, the level of credibility in the type of a road being recognized as an expressway is determined depending on the velocity of the vehicle 5 obtained by the speedometer 20. This makes it possible to increase the level of road-type recognition credibility.

In step S125 as an example, it is possible not to count the number of intersections based on the recognized results representing that the level of credibility is lower than a predetermined value. This results in a further improvement of the level of credibility in the recognized results.

[Second Embodiment]

Next, a road type recognition device 2 according to a second embodiment will be described based on FIG. 5. In the second embodiment, the intersection recognition process, i.e. the subroutine, performs weighting on the level of credibility in recognition of intersections using the position of the vehicle 5 in place of using the number of traffic markers and/or the number of stationary/moving objects.

Figure 5:
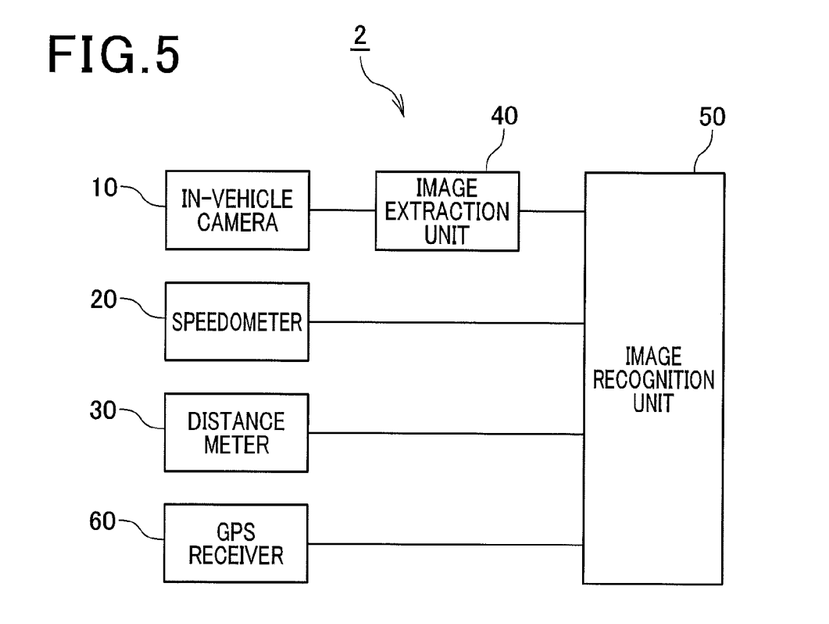
FIG. 5 is a block diagram illustrating a schematic structure of a road type recognition device according to the second embodiment of the disclosure.

Specifically, the road type recognition device 2 according to the second embodiment is equipped with a GPS receiver 60 as illustrated in FIG. 5. The GPS receiver 60 is a device to obtain positioning information from the GPS satellites, and obtains the current position of the vehicle 5 based on the obtained positioning information. A road map is stored in the ROM of the image recognition unit 50.

Figure 3:
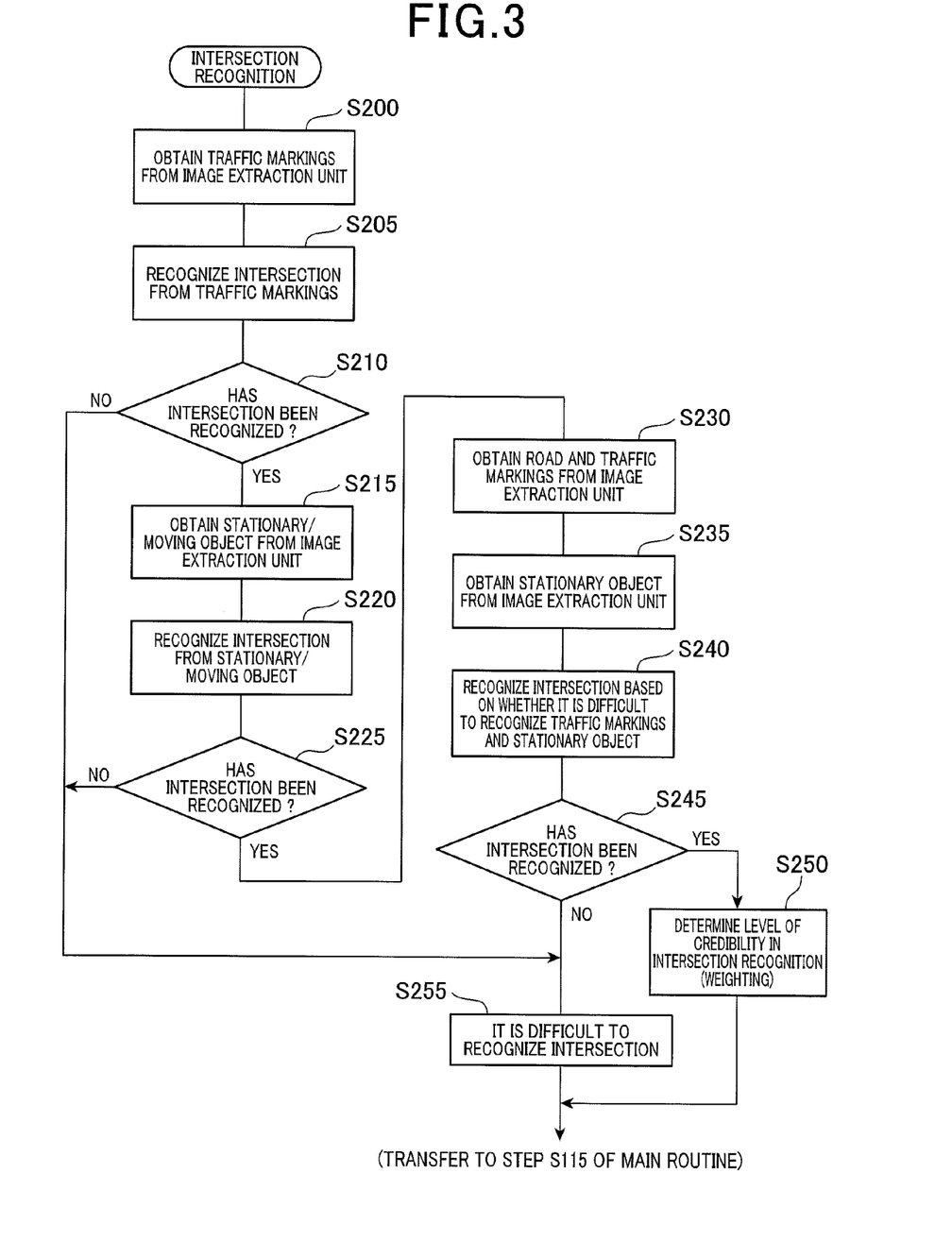
FIG. 3 is a flowchart illustrating the flow of an intersection recognition process, which is a subroutine of the road type recognition process illustrated in FIG. 2.

Additionally, at step S245 of the flowchart illustrated in FIG. 3 according to the first embodiment, the current position of the vehicle 5 is obtained from the GPS receiver 60.

At step S245, the level of credibility is increased as the obtained current position on the road map is close to an intersection, and is reduced as the obtained current position on the road map is far from an intersection.

As described above, if the position of the vehicle is close to an intersection, it is possible to improve the level of reliability in intersection recognition using such information. For this reason, the road type recognition device 2 is configured to weight the determined level of credibility using the information, thus improving the level of reliability.

[Third Embodiment]

Figure 6:
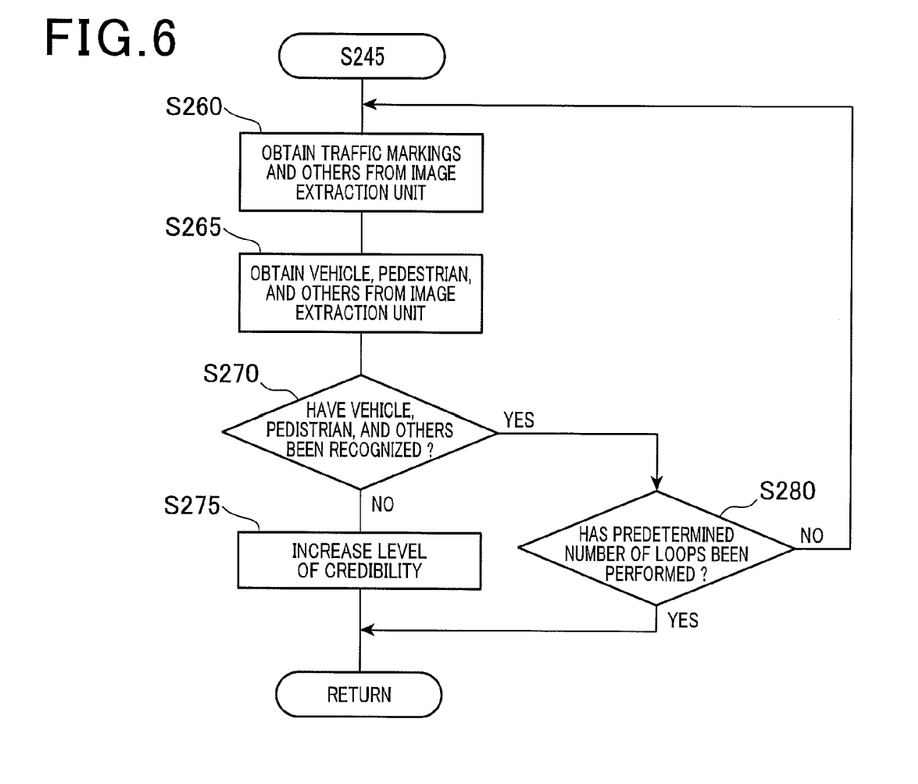
FIG. 6 is a flowchart illustrating the flow of an intersection recognition process according to the third embodiment of the disclosure; the flow of the intersection recognition process illustrates an additional process to the flowchart according to the second embodiment.

Next, a third embodiment will be described based on FIG. 6.

In the third embodiment, at step S245 of the intersection recognition process illustrated in FIG. 3, if it is determined that an intersection has been recognized (step S245: Yes), the CPU 50*a* transfers the process to step S260 as illustrated in FIG. 6 instead of transferring the process back to the main routine.

At step S260, the CPU 50*a* obtains the traffic markings extracted by the Image extraction unit 40, which is similar to step S200 (see FIG. 3). At that time, the number of obtained traffic markings is also obtained.

At subsequent step S265 similar to the step S215 (see FIG. 3), stationary/moving object information for intersection identification is obtained in addition to the traffic markings. The stationary/moving object information for intersection identification includes:

a pedestrian bridge;

a vehicle 6 moving sideways relative to the vehicle 5;

a pedestrian crossing 7 which is in the same movement direction as that of the vehicle 5;

pedestrians walking across a pedestrian crossing 7 which is in the same movement direction as that of the vehicle 5; and a bicycle 8 going across a pedestrian crossing 7 which is in the same movement direction as that of the vehicle 5.

At that time, the number of obtained stationary/moving objects is also obtained.

At step S270, the CPU 50*a* determines whether the traffic markings obtained at step S260 or the stationary/moving objects obtained at step S265 have been recognized. If it is determined that they have not been recognized (step S270: No), the CPU 50*a* transfers the process to step S275. Otherwise, if it is determined that they have been recognized (step S270: No), the CPU 50*a* transfers the process to step S280.

At step S275, the CPU 50*a* further improves the level of credibility determined at step S245 (see FIG. 3). At this time, it further improves the level of reliability as the number of the traffic markings obtained at step S260, the number of stationary objects obtained at step S265, or the number of moving objects obtained at step S265 increases.

Additionally, in the third embodiment, the level of credibility in intersection recognition can be weighted depending on the position of the vehicle 5, which is similar to the second embodiment.

Specifically, as illustrated in FIG. 5, the GPS receiver 60 is provided. In the ROM of the image recognition unit 50, the road map is stored. Furthermore, at step S250 of the flowchart illustrated in FIG. 3 according to the first embodiment, the CPU 50*a* can:

obtain the current position of the vehicle 5 from the GPS receiver 60;

increase more the level of credibility the closer the obtained current position is to an intersection on the map; and decrease more the level of credibility the further the obtained current position is from an intersection on the map.

The road type recognition device 2 is configured to have recognized passing through an intersection when, after recognition of the intersection, having difficulty recognizing all of:

traffic markings;

a vehicle 6 moving sideways relative to the vehicle 5;

a pedestrian crossing 7 which is in the same movement direction as that of the vehicle 5;

pedestrians walking across the corresponding pedestrian crossing 7 which is in the same movement direction as that of the vehicle 5; and a bicycle 8 going across a pedestrian crossing 7 which is in the same movement direction as that of the vehicle 5.

This results in further improvement of the level of credibility in the results of intersection recognition.

The level of credibility in the recognition of passing through an intersection is determined based on the number of recognition of any one of:

traffic markings;

vehicles 6 moving sideways relative to the vehicle 5;

pedestrian crossings 7 each of which is in the same movement direction as that of the vehicle 5; and bicycles 8 and vehicles 5 going across a pedestrian crossing 7 which is in the same movement direction as that of the vehicle 5.

This improves the level of recognition credibility.

The GPS receiver 60 is provided so that the determined level of credibility is weighted based on the position of the vehicle 5 acquired by the GPS receiver 60, resulting in an increase of the level of credibility.

[Other Embodiments]

The embodiments of the present invention have been described The invention's embodiments are described. The present invention is not limited to the embodiments, and can include various modifications.

For instance, the positions of the road surface markings, mark lines, and others, which are located close to intersections, may not be limited to fixed ones, so that, because their drawn positions or orders vary depending on variations of corresponding areas, the drawn positions or orders can be readably stored in a storage unit.

Additionally, road surface markings, mark lines, and others are not limited to ones described in the embodiments, and therefore, ones drawn in the vicinity of intersections can be similarly treated based on the technologies described in the embodiments.

REFERENCE SIGNS LIST

1, 2 Road type recognition device, 5 Vehicle, 6 Vehicle 7 . . . Pedestrian crossing, 8, 9 . . . Bicycle, 10 . . . In-vehicle camera, 20 . . . Speedometer, 30 . . . Distance meter, 40 . . . Image extraction unit 50, Image recognition unit, 60 . . . GPS receiver

The invention claimed is:

1. An intersection recognition device installed in a vehicle, the intersection recognition device comprising:

an image acquisition unit that acquires images around the moving vehicle;

an extraction unit that extracts, from the images acquired by the image acquisition unit, a type and a position of at least one traffic marking existing around the vehicle; and a determination unit that determines whether an intersection exists based on the type of the at least one traffic marking extracted by the extraction unit and a relative position relationship between the at least one traffic marking and the vehicle, wherein:

the extraction unit extracts a type and a position of at least one peripheral object in addition to the at least one traffic marking; and the determination unit determines that the vehicle has passed through an intersection when having difficulty recognizing the at least one traffic marking and the at least one peripheral object after the positions of the at least one traffic marking and the at least one peripheral object relative to the vehicle are gradually shortened.

2. The intersection recognition device according to claim 1, wherein:

the extraction unit extracts a road surface marking or a mark line as the at least one traffic marking, the road surface marking or the mark line being a diamond-shape mark indicating an existence of a pedestrian crossing, an arrow for straight or left/right turn, a stop line, a stop sign, a pedestrian crossing, a bicycle crossing, a broken line located inside a lane line, a destination name, or a road color.

3. The intersection recognition device according to claim 1, wherein:

the at least one peripheral object being comprised of at least one of a stationary object and a moving object, the at least one of the stationary object and the moving object existing around the vehicle; and the determination unit determines whether an intersection exists based on the type and the position of the at least one peripheral object extracted by the extraction unit in addition to the at least one traffic marking, the position of the at least one peripheral object being relative to the vehicle.

4. The intersection recognition device according to claim 1, further comprising:

a credibility determination unit that determines, based on at least one of the number of the at least one traffic marker and the number of the at least one peripheral object, a level of credibility in a determination result by the determination unit, the at least one traffic marker and the number of the at least one peripheral object being extracted by the extraction unit, the determination result representing an existence of an intersection.

5. The intersection recognition device according to claim 4, further comprising:

a velocity obtaining unit that obtains velocity of the vehicle, wherein:

the credibility determination unit performs weighting on the determined level of credibility based on the velocity of the vehicle obtained by the velocity obtaining unit.

6. The intersection recognition device according to claim 4, further comprising:

a position obtaining unit that obtains a position of the vehicle, wherein:

the credibility determination unit performs weighting on the determined level of credibility based on the position of the vehicle obtained by the position obtaining unit with respect to the intersection determined by the determination unit.

7. The intersection recognition device according to claim 1, wherein:

the determination unit determines that the vehicle has passed through an intersection when having difficulty recognizing the at least one traffic marking and the at least one peripheral object after it is determined that an intersection exists.

8. The intersection recognition device according to claim 7, further comprising:

a credibility determination unit that determines, based on at least one of the number of the at least one traffic marker and the number of the at least one peripheral object, a level of credibility in a determination result by the determination unit, the at least one traffic marker and the number of the at least one peripheral object being extracted by the extraction unit, the determination result representing an existence of an intersection.

9. The intersection recognition device according to claim 8, further comprising:

a velocity obtaining unit that obtains velocity of the vehicle, wherein:

the credibility determination unit performs weighting on the determined level of credibility based on the velocity of the vehicle obtained by the velocity obtaining unit.

10. The intersection recognition device according to claim 8, further comprising:

a position obtaining unit that obtains a position of the vehicle, wherein:

the credibility determination unit performs weighting on the determined level of credibility based on the position of the vehicle obtained by the position obtaining unit with respect to the intersection determined by the determination unit.

11. A road type recognition device comprising:

the intersection recognition device according to claim 1;

a distance obtaining unit that obtains a traveling distance of the vehicle; and a road recognition unit that recognizes that a type of a road on which the vehicle is traveling is:

an urban area road if the number of intersections recognized by the intersection recognition device is equal to or more than a predetermined number within a predetermined traveling distance obtained by the distance obtaining unit, or a road other than urban area roads if the number of intersections recognized by the intersection recognition device is less than the predetermined number within the predetermined traveling distance obtained by the distance obtaining unit.

12. The road type recognition device according to claim 11, further comprising:

a type credibility determination unit that determines a level of credibility in the type of the road being recognized to be an urban area road by the road recognition unit.

13. The road type recognition device according to claim 12, further comprising:

a velocity obtaining unit that obtains velocity of the vehicle, wherein:

the road recognition unit recognizes the type of the road on which the vehicle is traveling as an expressway if the velocity of the vehicle obtained by the velocity obtaining unit is equal to or more than predetermined velocity.

14. The road type recognition device according to claim 13, further comprising:

a type credibility determination unit that determines a level of credibility in the type of the road being recognized to be an express way by the road recognition unit.

15. The road type recognition device according to claim 11, further comprising:
a velocity obtaining unit that obtains velocity of the vehicle,
wherein:
the road recognition unit recognizes the type of the road on which the vehicle is traveling as an expressway if the velocity of the vehicle obtained by the velocity obtaining unit is equal to or more than predetermined velocity.

16. The road type recognition device according to claim 15, further comprising:
a type credibility determination unit that determines a level of credibility in the type of the road being recognized to be an express way by the road recognition unit.

* * * * *